United States Patent [19]
Sano

[11] Patent Number: 5,190,360
[45] Date of Patent: Mar. 2, 1993

[54] CONTROL METHOD FOR AN ANTISKID BRAKING SYSTEM

[75] Inventor: Yoshiaki Sano, Okazaki, Japan

[73] Assignee: Mitsubishi Jidosha Kogyo Kabushiki Kaisha, Tokyo, Japan

[21] Appl. No.: 713,864

[22] Filed: Jun. 12, 1991

[30] Foreign Application Priority Data

Jun. 15, 1990 [JP] Japan .................................. 2-158508

[51] Int. Cl.$^5$ .............................................. B60T 8/88
[52] U.S. Cl. ....................................... 303/92; 303/94; 303/109; 364/426.02
[58] Field of Search ............... 303/105, 106, 107, 108, 303/109, 94, 92; 364/426.02, 426.03

[56] References Cited

U.S. PATENT DOCUMENTS

| | | | |
|---|---|---|---|
| 3,912,340 | 10/1975 | Bertolasi | 303/109 |
| 4,027,926 | 6/1977 | Arai et al. | 303/109 |
| 4,836,616 | 6/1989 | Roper et al. | 303/109 X |
| 4,836,619 | 6/1989 | Muto | 303/109 |
| 4,886,322 | 12/1989 | Atkins | 303/109 |

Primary Examiner—Robert J. Oberleitner
Assistant Examiner—Lee W. Young

[57] ABSTRACT

A control method for an antiskid braking system according to the present invention comprises a step of calculating a reference body speed used for reference in effecting braking pressure control for wheels of an automobile. In this calculation step, a criterion wheel speed is set as a reference body speed before the start of the braking pressure control. In the calculation step after the start of the braking pressure control, the criterion wheel speed develops a tendency to skid for the first time, and the reference body speed separates from the criterion wheel speed and starts to be lowered with a fixed first gradient at a separating point of time when a calculated deceleration obtained from the criterion wheel speed exceeds a fixed deceleration value. When the output of a deceleration sensor ceases to be subject to response delay after the passage of a predetermined transition time starting at the separating point, thereafter, the reference body speed starts to be lowered with a second gradient based on the output of the deceleration sensor.

12 Claims, 8 Drawing Sheets

CONTROL METHOD FOR AN ANTISKID BRAKING SYSTEM

BACKGROUND OF THE INVENTION

1. Field of the Invention

The present invention relates to a control method for an antiskid braking system for preventing wheels of an automobile from being locked when the automobile is braked, and more particularly, to a control method for an antiskid braking system adapted for use in a four-wheel-drive automobile.

2. Description of the Related Art

Automobiles with an antiskid braking system have recently been increasing. The antiskid braking system can prevent wheels of an automobile from skidding or locking when the automobile is braked. Thus, automobiles with this system can enjoy improved driving stability and greatly reduced braking distance when they are braked.

According to the antiskid braking system, the respective speeds of the individual wheels, that is, wheel speeds, are obtained by means of wheel speed sensors, and a pseudo speed of the body of the automobile or a reference body speed is calculated on the basis of these wheel speeds. If any one of the wheel speeds is lower than the calculated reference body speed by a predetermined value out of the permissible range, it is concluded that the wheel concerned is subject to a skid. In this case, the system controls the brake unit associated with this wheel in order to reduce the braking force on the wheel. When the braking force on the wheel is reduced so that the wheel speed is restored, thereafter, the system repeatedly hold, increase, or reduce the braking force as required by activating the brake unit, thereby causing the wheel speed to follow up the reference body speed. Thus, the wheel can be effectively prevented from locking.

In order to optimally control the braking force on a wheel which tends to skid by means of the antiskid braking system, the reference body speed should be accurately calculated, as is evident from the above description. According to the conventional system, a specific wheel speed, among other wheel speeds, is selected as a criterion wheel speed, and the reference body speed is set on the basis of this criterion wheel speed.

According to the aforesaid method for calculating the reference body speed, the reference body speed can be accurately obtained without hindrance for all the driving conditions of the automobile if the automobile is of the two-wheel-drive type. In the case of a four-wheel-drive automobile, however, the calculated reference body speed takes an inaccurate value in a certain driving condition.

The driving condition in which the reference body speed is inaccurate is a case where all the wheels of the four-wheel-drive automobile slip or skid simultaneously. Since the rotational behavior of front and rear wheel of the automobile of this type are restricted to each other by means of a drive system which connects between the front and rear wheel sides, the four wheels are liable to skid simultaneously.

If the specific wheel speed is selected as the criterion wheel speed, that is, the reference body speed, when all the four wheels are skidding, the reference body speed naturally takes a smaller value than that of the actual body speed. In this case, however, the deviation between the reference body speed and each wheel speed takes only a small value. In these circumstances, therefore, the antiskid braking system concludes that the road on which the automobile is running is a high-$\mu$ road, and further increases the braking force on each wheel, thereby possibly helping all the four wheels lock at the same time. The reference $\mu$ indicates the coefficient of friction between the road and the wheel.

To cope with this, the antiskid braking system may be provided with a sensor for detecting the deceleration of the body. With use of this sensor, either the criterion wheel speed obtained from the wheel speed sensors or an output from the deceleration sensor can be selected so as to calculate the reference body speed, depending on the driving conditions.

The deceleration sensor, however, cannot deliver a signal indicative of the deceleration immediately after it starts to receive the deceleration, due to the detecting mechanism of the sensor for the deceleration. In the initial stage of the automobile braking operation, therefore, the output from the deceleration sensor is subject to a response delay. Thus, a reference body speed of a desired accuracy cannot be obtained by only selecting and setting the output of the deceleration sensor or the criterion wheel speed as the reference body speed.

SUMMARY OF THE INVENTION

The object of the present invention is to provide a control method for an antiskid braking system capable of controlling the braking force on each wheel of even a four-wheel-drive automobile by optimally calculating a reference body speed.

The above object is achieved by a control method according to the present invention applied to an antiskid braking system which comprises wheel speed sensors attached individually to several wheels to detect the respective speeds of the wheels, a deceleration sensor attached to the body of automobile to detect the deceleration of the body, and brake units attached individually to the wheels to control braking forces on the wheels. The control method comprises: a first step for calculating a criterion wheel speed, the first step including a first process for selecting one of the wheel speeds, obtained by means of the wheel speed sensors, as a selected wheel speed, and a second process for calculating the criterion wheel speed on the basis of the selected wheel speed; a second step for obtaining a detected deceleration of the body on the basis of an output from the deceleration sensor, the second step being executed in parallel with the first step; a third step for obtaining a calculated deceleration on the body by differentiating the criterion wheel speed; a fourth step for calculating a reference body speed in accordance with the value of the calculated deceleration, the fourth step including a third process for setting the reference body speed to the criterion wheel speed when the value of the calculated deceleration is not greater than a predetermined deceleration value, a fourth process for lowering the obtained reference body speed with a fixed first gradient during a predetermined transition time after the point of time when the calculated deceleration exceeds by the predetermined deceleration value, and a fifth process for lowering the obtained reference body speed with a second gradient, which is determined corresponding to the detected deceleration of the body, after the passage of the transition time; and a fifth step for controlling the operation of the brake unit of a corresponding one of the wheels when at least one of the wheel speeds develops a tendency to skid so that the wheel speed follows up the set reference body speed, the steps being executed repeatedly.

According to the control method of the present invention described above, if the value of the calculated deceleration obtained by differentiating the criterion wheel speed is greater than the predetermined deceleration value, that is, if a selected wheel having the criterion wheel speed develops a tendency to skid when the automobile is braked, the fourth step for calculating the reference body speed is executed.

In this fourth step, the reference body speed is calculated on the assumption that the criterion wheel speed or the reference body speed at a separating point of time when the selected wheel or the criterion wheel speed develops a tendency to skid, lowers with the fixed first gradient during the predetermined transition time after the separating point of time. Thus, on and after the separating point, the reference body speed is set separately from the criterion wheel speed. Even if the criterion wheel speed develops a tendency to skid in the initial stage of the braking operation in which the output of the deceleration sensor is unstable, the reference body speed is lowered with the fixed first gradient during the transition time starting at the separating point. Thus, the reference body speed is set in accordance with previously assumed characteristics. The reference body speed set in this manner can never be extremely deviated from the actual body speed.

When the transition time after the separating point of time terminates, the reference body speed is lowered with the second gradient which is determined correspondingly to the detected deceleration of the body, obtained by means of the deceleration sensor. After the passage of the transition time, the output of the deceleration sensor is stabilized, so that the calculated reference body speed can be approximated to the actual body speed with high accuracy by calculating it in accordance with the detected deceleration of the body.

Thus, according to the control method of the present invention, the reference body speed can be properly calculated even though the criterion wheel speed develops a tendency to skid. Based on this reference body speed, therefore, it can be accurately determined whether or not any wheel tends to skid. Moreover, the tendency to skid can be eliminated most effectively by controlling the braking force on the wheel which tends to skid so that the speed of this wheel follows up the reference body speed.

Preferably, the deceleration sensor is formed of a linear deceleration sensor. Since the output of the linear deceleration sensor linearly changes with respect to the detected deceleration of the body, the setting accuracy of the reference body speed can be improved if this speed is calculated on the basis of the detected deceleration from the deceleration sensor. When using the linear deceleration sensor, variations of its output attributable to noises, that is, variations of the detected deceleration, can be restrained by processing the sensor output by means of a filter. Thus, a reliable detected deceleration can be obtained from the deceleration sensor. Further, a response delay of the linear deceleration sensor, which may be caused as the sensor output is filtered, can be removed by properly setting the transition time.

If the body tends to be decelerated in a manner such that the value of the calculated deceleration is greater than the second deceleration value, which is determined in accordance with the detected deceleration, even though the calculated deceleration is smaller than the fixed first deceleration value, and if this state is maintained for a predetermined continuance time, the reference body speed should preferably be calculated on the assumption that it then separates from the criterion wheel speed and lowers with the second gradient. According to this way of control, the skidding of the selected wheel or the reference wheel can be accurately detected in consideration of the detected deceleration from the deceleration sensor even though the reference wheel slowly starts to skid without causing the calculated deceleration to reach the fixed deceleration value. The reference body speed can enjoy a proper value if it is calculated on the assumption that it starts to lower with the second gradient at the time of the detection of slow skidding. In this case, the aforesaid continuance time is set on the assumption that as the reference wheel slowly starts to skid, the response delay of the deceleration sensor arouses no problem.

If the criterion wheel speed is restored to the level of the reference body speed while the reference body speed is being calculated separately from the criterion wheel speed, it is advisable to use the criterion wheel speed as the reference body speed immediately at this point of time. According to this way of control, the output of the deceleration sensor is not used for very long for the calculation of the reference body speed. Accordingly, the reference body speed can always be calculated or set with high accuracy without entailing an accumulation of errors in the sensor output.

As the criterion wheel speed is being restored to the level of the reference body speed and the reference body speed is being calculated as the criterion wheel speed after temporarily separating therefrom, as mentioned before, the reference body speed is being calculated on the assumption that it is calculated separately from the criterion wheel speed and starts to lower with the second gradient when a tendency of the body to decelerate, such that the value of the calculated deceleration is greater than the second deceleration value is detected thereafter. If the reference wheel develops a second tendency to skid and its subsequent ones in the aforesaid manner, the response delay of the deceleration sensor causes no problem even when the output of the deceleration starts to be used at this point of time. Thus, the deceleration sensor output can be effectively used, so that the accuracy of the calculated reference body speed can be improved.

The above and other objects, features, and advantages of the invention will be more apparent from the ensuing detailed description taken in connection with the accompanying drawings.

DETAILED DESCRIPTION OF THE PREFERRED EMBODIMENTS

Figure 1:
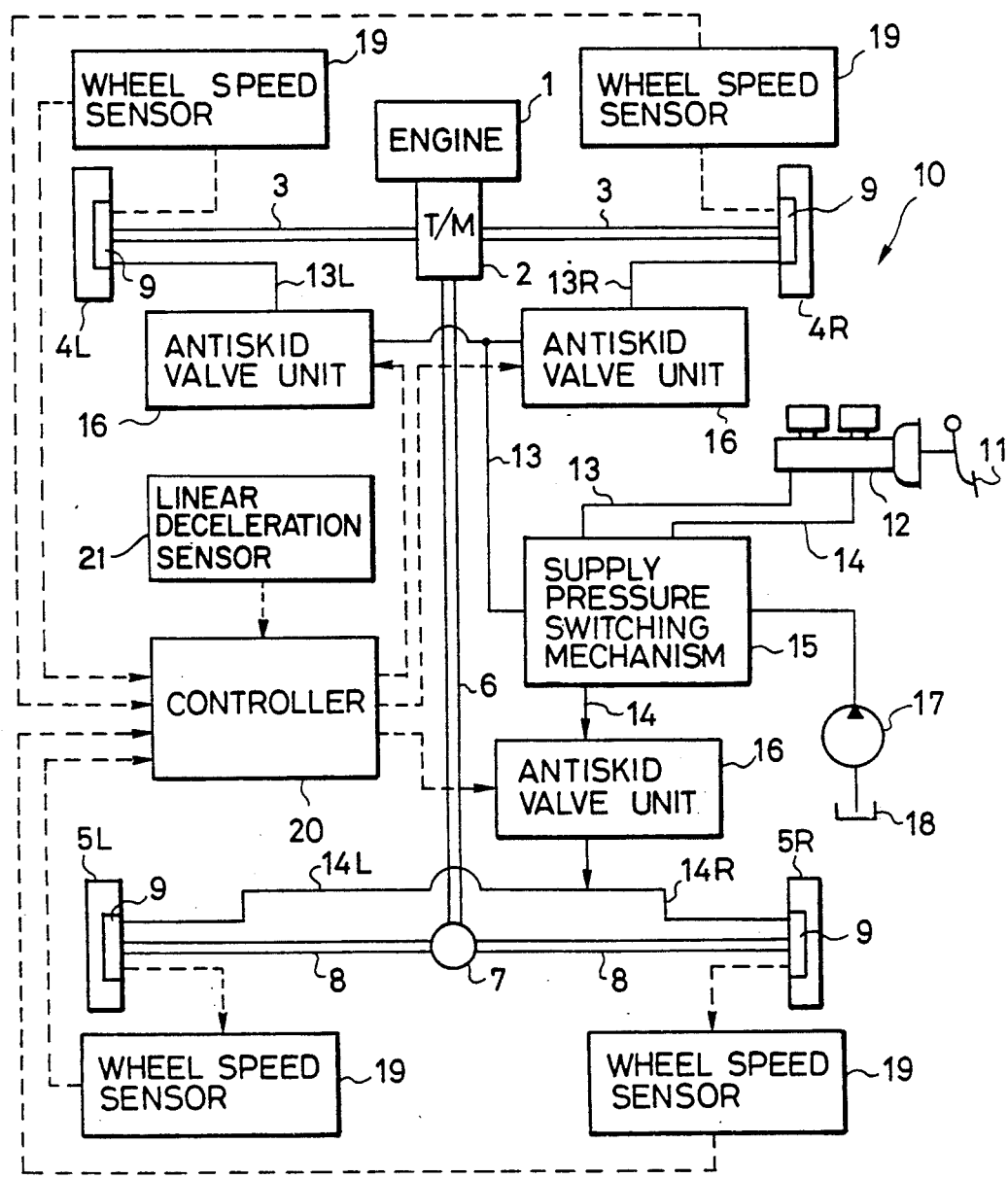
FIG. 1 is a schematic view of an automobile furnished with an antiskid braking system.

Referring to FIG. 1, there is shown a four-wheel-drive automobile furnished with an antiskid braking system. A driving force generated from an engine 1 of the automobile is transmitted to left and right front wheels $4_L$ and $4_R$ through a transmission 2 and a pair of front axles 3. On the other hand, the driving force from the transmission 2 is transmitted to left and right rear wheels $5_L$ and $5_R$ through a transfer (not shown), propeller shaft 6, differential gear 7, and a pair of rear axles 8.

Each of the front and rear wheels 4 and 5 is fitted with a wheel brake 9. These brakes 9 are connected to a hydraulic brake circuit 10. The brake circuit 10 is provided with a master cylinder 12 of a tandem type combined with a vacuum brake booster. The master cylinder 12 is actuated by means of the vacuum brake booster when a brake pedal 11 is worked.

The respective first ends of front and rear brake lines 13 and 14 are connected individually to two pressure chambers (not shown) of the master cylinder 12. The brake lines 13 and 14 extend via a supply pressure switching mechanism 15. A pair of branch lines $13_L$ and $13_R$ diverge from that part of the front brake line 13 situated on the downstream side of the switching mechanism 15, and are connected to the respective wheel brakes 9 of the left and right front wheels $4_L$ and $4_R$, respectively. Likewise, a pair of branch lines $14_L$ and $14_R$ diverge from that part of the rear brake line 14 situated on the downstream side of the switching mechanism 15, and are connected to the respective wheel brakes 9 of the left and right rear wheels $5_L$ and $5_R$, respectively.

An antiskid valve unit 16 is disposed on each of the branch lines $13_L$ and $13_R$ of the front brake line 13, while another valve unit 16 is disposed at that part of the rear brake line 14 situated between the switching mechanism 15 and the branch lines $14_L$ and $14_R$.

Further, a hydraulic pump 17 is connected to the switching mechanism 15. The pump 17 sucks up a pressure liquid in a reservoir tank 18, pressurizes the liquid to a predetermined pressure, and supplies it to the switching mechanism 15. During control operation for the antiskid braking system or ABS control, therefore, the respective wheel brakes 9 of the individual wheels are supplied not with a static pressure from the master cylinder 12 but with a dynamic pressure from the hydraulic pump 17, by the agency of the switching mechanism 15. At this time, the valve unit 16 for a wheel which tends to skid is actuated, whereby the pressure in the wheel brake 9 of this wheel, that is, the braking force on the wheel, is controlled.

Each of the front and rear wheels 4 and 5 is provided with a wheel speed sensor 19 which is used to control the switching operation for each corresponding antiskid valve unit 16 during the ABS control. These sensors 19 detect the respective speeds of their corresponding wheels, and supply their respective detection signals to a controller 20.

A linear deceleration sensor 21 for continuously detecting the deceleration of the body of automobile is located in a predetermined position on the body. A detection signal from the sensor 21 is also supplied to the controller 20.

When the automobile is braked, the controller 20 calculates a reference body speed on the basis of the detection signals from the individual wheel speed sensors 19 and the linear deceleration sensor 21. Based on the respective speeds of the wheels with respect to the calculated reference body speed, moreover, the controller 20 determines whether or not any of the wheels tends to skid. If there is any wheel which tends to skid, the controller 20 delivers a control signal to the valve unit 16 corresponding to this wheel, so that the braking pressure of the wheel brake 9 associated with this valve unit 16 is properly controlled.

In FIG. 1, return lines connecting the reservoir tank 18 and the individual wheel brakes 9 are omitted for simplicity of illustration.

Referring now to the drawings of FIGS. 2 to 5, a control method for the antiskid braking system executed by means of the controller 20, especially a calculation routine for the reference body speed, will be described.

The calculation routine for the reference body speed, which constitutes part of a main control routine for the antiskid braking system, is repeatedly executed with every predetermined control cycle time.

Calculation Routine for Reference Body Speed

Figure 2:
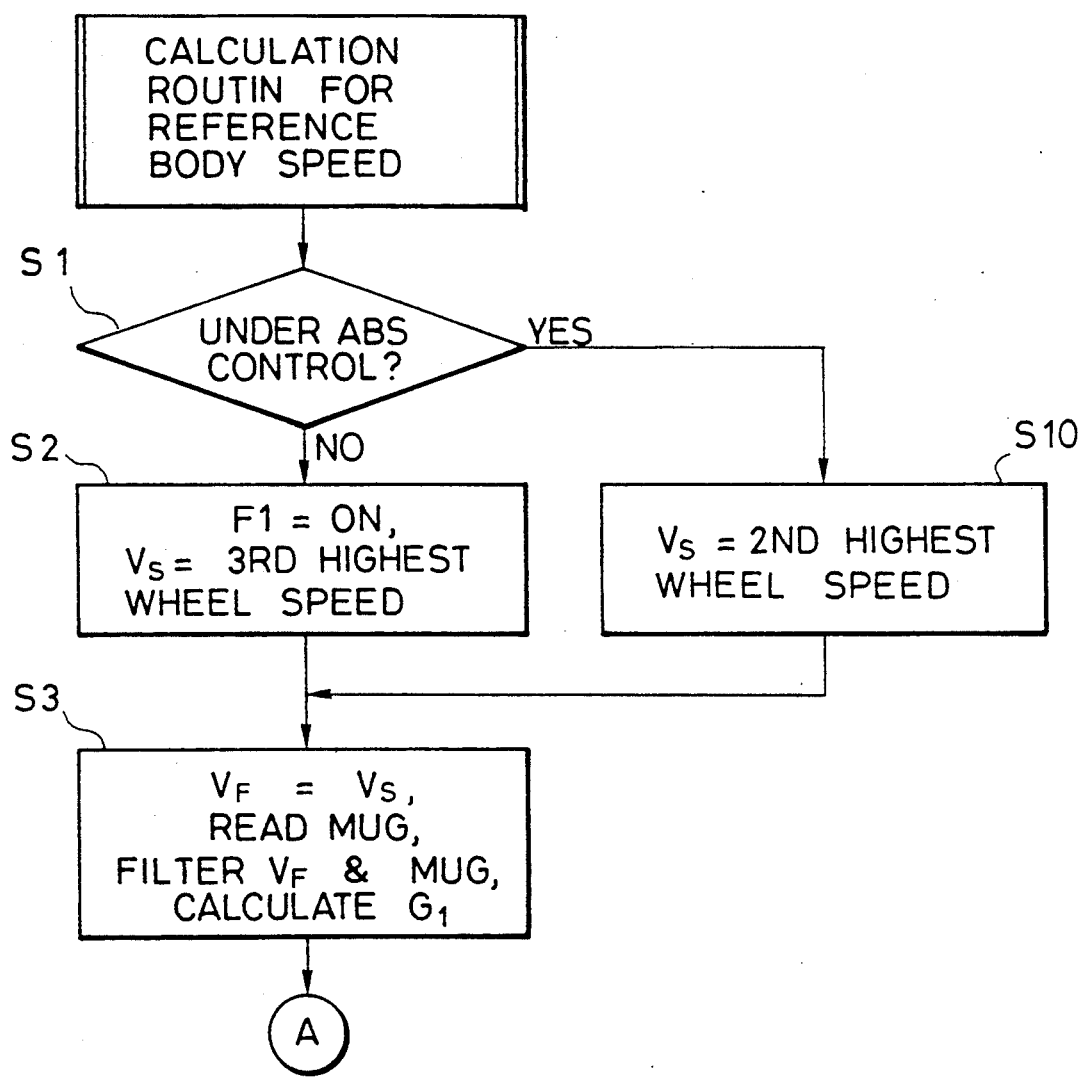
FIGS. 2 to 5 are flow charts illustrating steps of procedure for calculating a reference body speed in a control method for the system.

First, in Step S1 of FIG. 2, it is determined whether or not the ABS control is being executed. More specifically, it is determined whether or not the speed of at least one of the wheels is lower by a predetermined value than a criterion wheel speed $V_F$ when the brake pedal 11 is worked so that the automobile starts to be braked. The criterion wheel speed $V_F$ is set in the manner mentioned later in the preceding calculation routine.

If the brake pedal 11 is not worked, or immediately after it is worked, the result of the decision in Step S1 is NO, so that Step S2 is executed. In Step S2, a flag $F_1$ is turned on, and the third highest wheel speed, among other wheel speeds obtained by means of the wheel speed sensors 19, is selected as a wheel speed $V_S$.

In Step S3, the selected wheel speed $V_S$ is first set as the criterion wheel speed $V_F$. Secondly, a deceleration MUG of the body is read in response to the detection signal from the linear deceleration sensor 21. Thirdly, the criterion wheel speed $V_F$ and the detected deceleration MUG are properly filtered. Fourthly, the criterion wheel speed $V_F$ is differentiated to obtain a calculated deceleration $G_1$ of the body.

Figure 3:
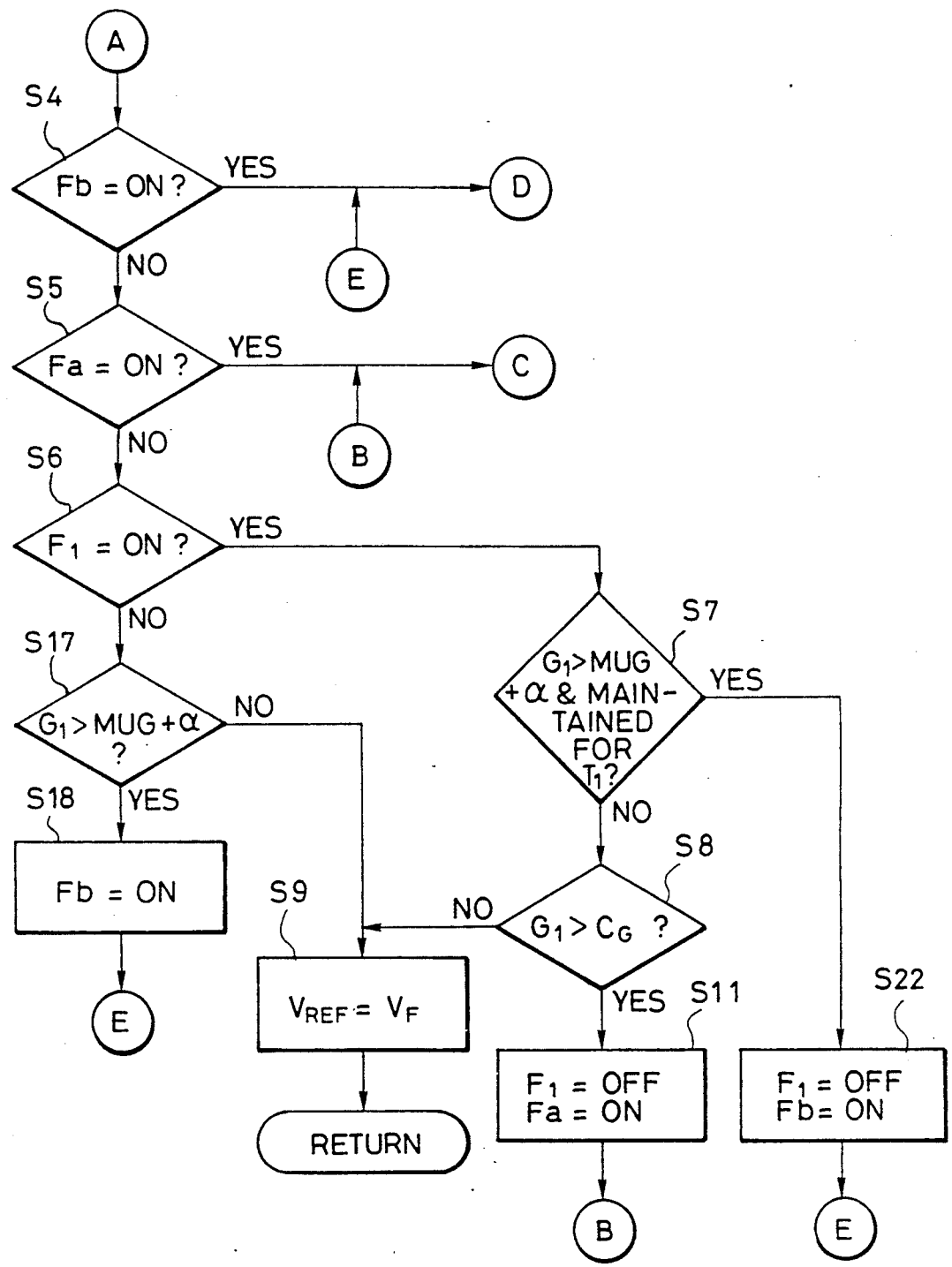
Figure 4:
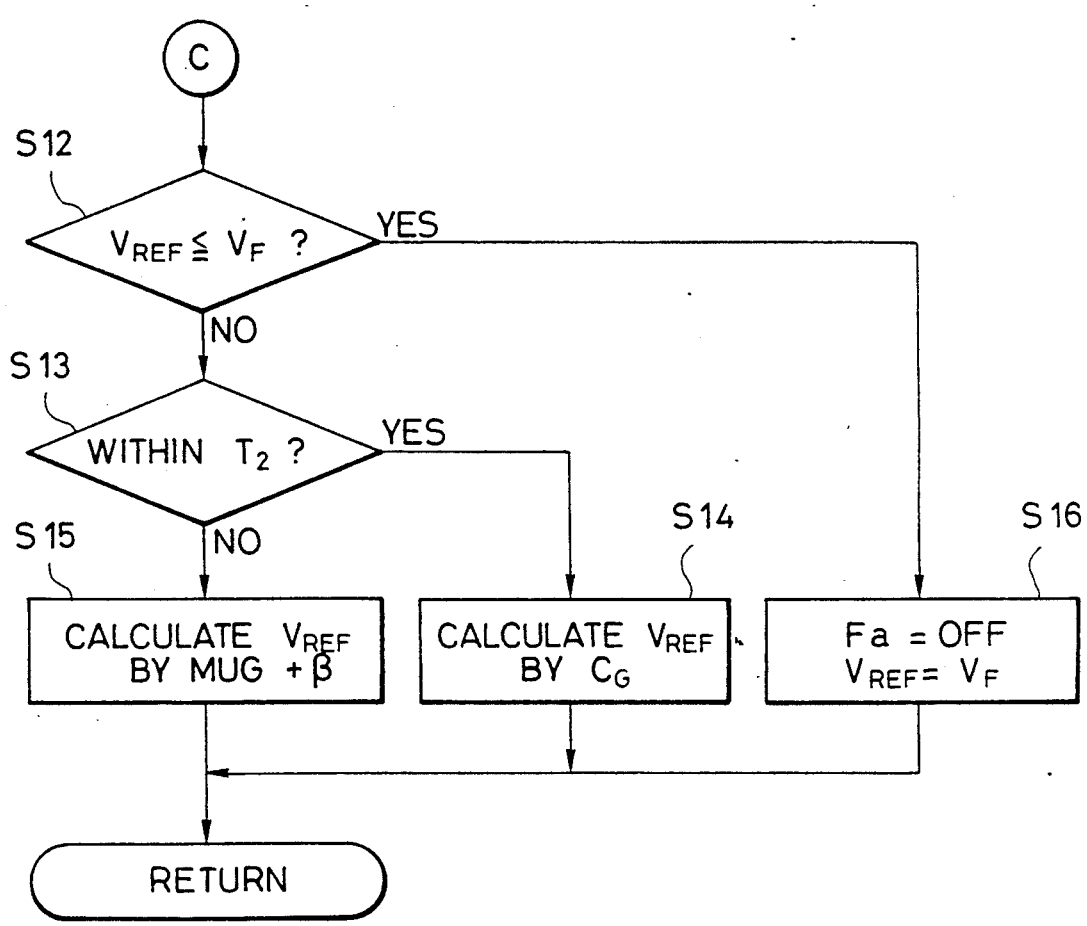

The program proceeds successively from Step S3 to Steps S4 and S5 shown in FIG. 3, whereupon it is determined whether or not flags Fa and Fb are on. At this point of time, neither of the flags Fa and Fb is on, so that the program proceeds from Steps S4 and S5 to Step S6.

In Step S6, it is determined whether or not the flag $F_1$ is on. Since Step S2 is already executed by this point of time, the result of the decision in Step S6 is YES. Accordingly, the decision of Step S7 is made. In Step S7, it is determined whether or not the calculated deceleration $G_1$, obtained from the criterion wheel speed $V_F$, and the detected deceleration MUG have the following relationship, and whether or not this state is maintained for a predetermined maintenance time $T_1$ (e.g., 100 msec).

$$G_1 > MUG + \alpha.$$

The value of $\alpha$ is, e.g., 0.25 g, the symbol g representing the acceleration of gravity.

At this point of time, the result of the decision in Step S7 is NO, so that the program proceeds to Step S8. More specifically, since the then result of the comparison in Step S1 is NO, the discriminating conditions of Step S7 cannot be fulfilled.

In Step S8, it is determined whether or not the value of the calculated deceleration $G_1$ is greater than a fixed deceleration value $C_G$ (e.g., 1.4 g). For the same reason as in the case of Step S7, the result of the comparison in Step S8 is NO, so that the program proceeds to Step S9. In Step S9, the reference wheel speed $V_F$ is set as a reference body speed $V_{REF}$.

Thereafter, the program returns from the calculation routine for the reference body speed $V_{REF}$ to the main control routine, and then to the next routine, that is, a braking pressure control routine for controlling the operation of the antiskid valve units 16. At this point of time, however, the ABS control is not being undergone, so that the braking pressure control routine cannot be executed. Thus, only the reference body speed $V_{REF}$ can be calculated in these running conditions.

When the result of the decision in Step S1 turns to YES as the aforesaid calculation routine is repeatedly executed, thereafter, the program proceeds to Step S3 via Step S10, not Step S2. In Step S10, the second highest wheel speed, among other wheel speeds obtained by means of the wheel speed sensors 19, is set as the selected wheel speed $V_S$.

If the highest wheel speed is selected as the selected wheel speed $V_S$ during the ABS control, the variation of the criterion wheel speed $V_F$ is small, so that the automobile can enjoy an advantage when it runs straight on a low-$\mu$ road. When the automobile turns, however, the speed of the outside driving wheel (with respect to the turning), which is higher than that of the inside driving wheel, is set as the selected wheel speed $V_S$, and the reference body speed $V_{REF}$ calculated on the basis of the speed $V_S$ is higher than the actual body speed as a natural consequence.

In controlling the speed of a wheel which tends to skid so as to follow the speed of the wheel to the reference body speed $V_{REF}$, that is, in controlling the braking pressure on this wheel, in these circumstances, the braking pressure is unduly reduced, so that the braking force on the wheel will be insufficient. In this embodiment, therefore, the second highest wheel speed is selected as the selected wheel speed $V_S$ in consideration of the conditions for both the cases where the automobile is running straight on a low-$\mu$ road and where it is turning, during the ABS control.

Immediately after the start of the ABS control, the program proceeds from Step S10 to Steps S3, S4, S5 and S6 in succession, in the same manner as aforesaid, and then the decisions of Steps S7 and S8 are made. If both the results of the decisions in Steps S7 and S8 are NO, Step S9 is executed even during the ABS control, whereupon the reference wheel speed $V_F$ is set as the reference body speed $V_{REF}$.

If the criterion wheel positively tends to skid immediately after the start of the ABS control, however, the result of the decision in Step S8 is YES even though the result of the decision in Step S7 is NO. Thus, in these conditions, the calculated deceleration $G_1$ resulting from the criterion wheel speed $V_F$ takes a value greater than the fixed deceleration value $C_G$ which is not smaller than the allowable deceleration value for the body. In this case, therefore, the flag $F_1$ is reset or turned off in Step S11, while the flag Fa is turned on. Step S11 is followed by Step S12 shown in FIG. 4.

In Step S12, it is determined whether or not the reference body speed $V_{REF}$ is not higher than the criterion wheel speed $V_F$. As seen from the result of the decision in Step S8 of FIG. 3, the result of the decision in Step S12 is NO. More specifically, if the criterion wheel positively tends to skid, the criterion wheel speed $V_F$ is much lower than the reference body speed $V_{REF}$ set at the time of the execution of the preceding calculation routine, so that the result of the decision in Step S12 is NO.

In Step S13, it is determined whether or not a predetermined transition time $T_2$ (e.g., 80 msec) has passed after the positive decision (YES) in Step S8. Immediately after the positive decision in Step S8 is made, the result of the decision in Step S13 is still YES, so that Step S14 is then executed.

In Step S14, the reference body speed $V_{REF}$ is set at a value lower by the fixed deceleration value $C_G$, without taking the criterion wheel speed $V_F$ into consideration.

Thus, when the braking pressure control routine is executed after the program returns from the calculation routine to the main control routine, thereafter, the pressure in each wheel brake 9, that is, the braking pressure of each brake 9, is controlled so that the respective speeds of the wheels including the criterion wheel follow up the reference body speed $V_{REF}$ calculated in Step S14, and that the slip factor of each wheel takes an optimum value.

When repeating the calculation routine after the braking pressure control routine, the flag Fa is already turned on in Step S11 of the preceding calculation routine. In this case, therefore, Step S1 and its subsequent steps are successively executed. Since the result of the decision in Step S5 is YES, the program advances directly to Step S12 from Step S5, whereupon Step S12 and its subsequent steps are executed. Thus, in these circumstances, the reference body speed $V_{REF}$ is lowered by the fixed deceleration value $C_G$ every time Step S14 is repeated. In this manner, the speed $V_{REF}$ is lowered with the fixed first gradient which depends on the deceleration value $C_G$.

When the calculation routine is repeated so that the aforesaid transition time $T_2$ passes, however, the result of the decision in Step S13 is NO, whereupon the reference body speed $V_{REF}$ is calculated in Step S15 instead of Step S14. Thus, in this case, the reference body speed $V_{REF}$ is lowered by a second deceleration value, which is obtained by adding a predetermined value $\beta$ (e.g., $\beta = 0.13$ g) to the detected deceleration MUG, after the passage of the transition time $T_2$.

When Step S15 is repeatedly executed, therefore, the reference body speed $V_{REF}$ continues to be lowered with the second gradient which is determined according the second deceleration value.

When the criterion wheel speed $V_F$ is restored to a level not lower than the reference body speed $V_{REF}$ calculated in the calculation routine as the aforesaid braking pressure control routine is executed in accordance with the speed $V_{REF}$, the result of the decision in Step S12 is YES, so that the reference body speed $V_{REF}$ is calculated in Step S16, in this case. In Step S16, the flag Fa is turned off, and the reference body speed $V_{REF}$ is adjusted again to the criterion wheel speed $V_F$.

Figure 6:
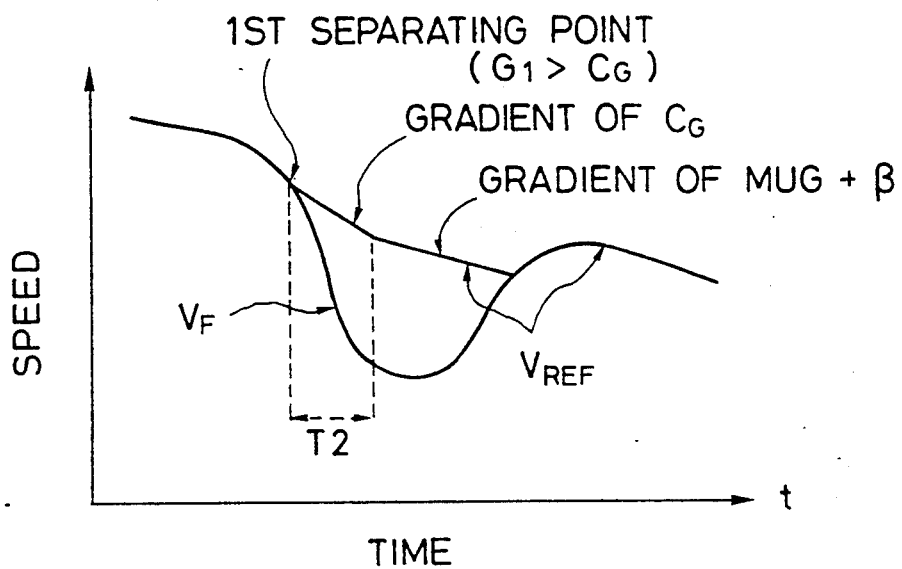
FIG. 6 is a graph showing time-based changes of a criterion wheel speed and the reference body speed obtained when a criterion wheel skids for the first time during the control operation of the system.

FIG. 6 shows the relationship between the reference body speed $V_{REF}$ and the criterion wheel speed $V_F$ described above. As seen from FIG. 6, the reference body speed $V_{REF}$ follows up the reference wheel speed $V_F$ before the criterion speed $V_F$ develops a tendency to skid, during the ABS control. However, when the criterion wheel first skids so that the fixed deceleration value $C_G$ is exceeded by the calculated deceleration $G_1$ of the criterion wheel speed $V_F$, that is, at a first separating point, the reference body speed $V_{REF}$ ceases to follow up the criterion wheel speed $V_F$, and starts to be calculated on the basis of the deceleration value $C_G$. Thus, during the transition time $T_2$ starting at the first separating point, the reference body speed $V_{REF}$ is calculated on the assumption that the reference body speed $V_{REF}$ obtained at the first separating point is lowered with the first gradient, which depends on the deceleration value $C_G$. Before the reference wheel speed $V_F$ is restored to the level not lower than the reference body speed $V_{REF}$, thereafter, the speed $V_{REF}$ is calculated on the assumption that it is lowered with the second gradient which depends on MUG+$\beta$.

If the calculation routine is repeated after the reference body speed $V_{REF}$ is adjusted again to the criterion wheel speed $V_F$, which is restored to the level not lower than the speed $V_{REF}$, all the results of the decisions in Steps S4, S5 and S6 shown in FIG. 3 are NO, so that the program proceeds from Step S6 to Step S17. In Step S17, it is determined whether or not the calculated deceleration $G_1$ is greater than MUG+$\alpha$. If the result of the decision in this step is NO, the reference body speed $V_{REF}$ is adjusted to the criterion wheel speed $V_F$ in Step S9.

Figure 5:
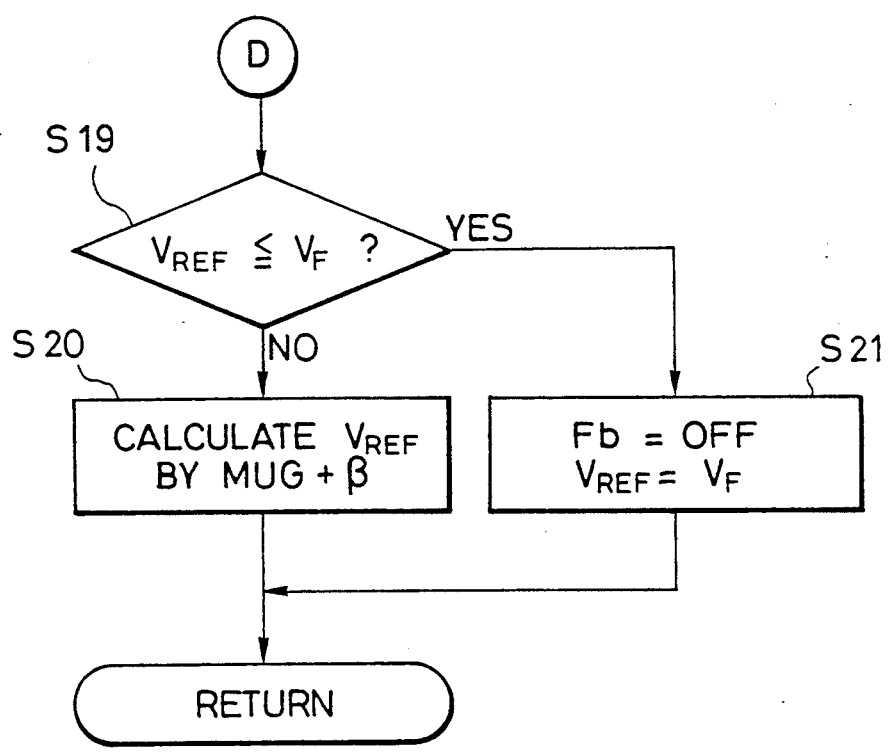

If the result of the decision in Step S17 is YES, that is, if the criterion wheel speed $V_F$ shows again some tendency to skid, however, the flag Fb is turned on in Step S18, whereupon Step S19 of FIG. 5 and its subsequent steps are executed thereafter.

In Step S19, as in Step S12 described before, it is determined whether or not the criterion wheel speed $V_F$ is not lower than the reference body speed $V_{REF}$. Since the criterion wheel speed $V_F$ is showing a tendency to skid when Step S19 is reached, as mentioned before, the result of the decision in Step S19 is NO, and the reference body speed $V_{REF}$ is calculated in Step S20. In Step S20, as in Step S15 of FIG. 4 described before, the reference body speed $V_{REF}$ is lowered by the second deceleration value which is obtained by adding the predetermined value $\beta$ to the detected deceleration MUG.

If the calculation routine is repeated in these conditions, Step S19 and its subsequent steps are repeatedly executed directly following Step S4, since the flag Fb is already turned on in Step S18 of the preceding calculation routine. Thus, until the result of the decision in Step S19 becomes YES, that is, before the criterion wheel speed $V_F$ is restored to the level not lower than the reference body speed $V_{REF}$, the speed $V_{REF}$ is lowered with the second gradient which depends on the second deceleration value.

If the result of the decision in Step S19 becomes YES, on the other hand, the flag Fb is turned off in Step S21, and the reference body speed $V_{REF}$ is adjusted again to the criterion wheel speed $V_F$.

Figure 7:
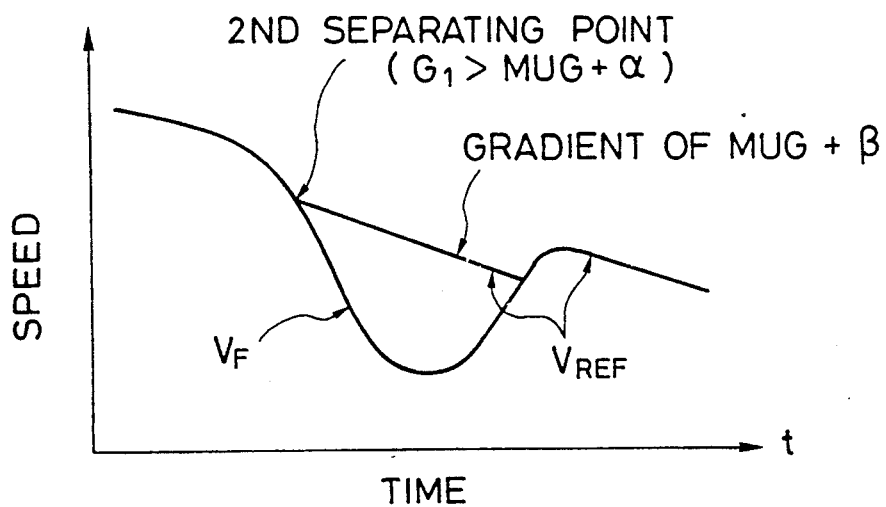
FIG. 7 is a graph showing time-based changes of the criterion wheel speed and the reference body speed obtained when the criterion wheel skids for the second time during the control operation of the system.

As described above, Step S19 shown in FIG. 5 and its subsequent steps are executed after the criterion wheel or the criterion wheel speed $V_F$ develops again a tendency to skid. In this case, the reference body speed $V_{REF}$ separates from the criterion wheel speed $V_F$ at a second separating point of time when MUG+$\alpha$ is exceeded by the calculated deceleration $G_1$, as shown in FIG. 7. On and after this second separating point, the reference body speed $V_{REF}$ is lowered with the second gradient until the criterion wheel speed $V_F$ is restored to the level not lower than the speed $V_{REF}$.

When repeatedly executing the calculation routine via Steps S19 and S21 after the criterion wheel speed $V_F$ is restored to the level of the reference body speed $V_{REF}$, the flag Fb is already turned off. As long as the result of the decision in Step S1 is kept YES, therefore, the results of the decisions in Steps S5 and S6 are NO, so that the decision of Step S17 is made. If the result of the decision in Step S17 becomes YES again, that is, if the criterion wheel speed $V_F$ develops again a tendency to skid, therefore, Step S19 of FIG. 5 and its subsequent steps are repeated to calculate the reference body speed $V_{REF}$.

In conclusion, if the criterion wheel or the criterion wheel speed $V_F$ develops a tendency to skid for the first time during the ABS control, the reference body speed $V_{REF}$ is calculated in the manner shown in FIG. 6. If the criterion wheel speed $V_F$ repeatedly develops a tendency to skid, thereafter, the reference body speed $V_{REF}$ is calculated in the manner shown in FIG. 7.

In the ABS control described above, Step S12 of FIG. 4 and its subsequent steps are executed after the result of the decision in Step S8 of FIG. 3 becomes YES and then the reference body speed $V_{REF}$ is calculated separately from the criterion wheel speed $V_F$. In this embodiment, however, the decision of Step S7 is first made before Step S8 is executed, as mentioned before. If the result of the decision in Step S7 becomes YES before the result of the decision in Step S8 becomes YES, therefore, the program advances from Step S7 to Step S22. In Step S22, the flag $F_1$ is turned off, while the flag Fb is turned on. Thus, Step S19 of FIG. 5 and its subsequent steps are executed directly after Step S22. In this case, if the calculated deceleration $G_1$ of the criterion wheel speed $V_F$ is higher than MUG+$\alpha$, and if this state lasts for the aforementioned maintenance time $T_1$, although the value of the calculated deceleration $G_1$ is not greater than the fixed deceleration value $C_G$, the reference body speed $V_{REF}$ is calculated in the manner shown in FIG. 7, on the assumption that the criterion wheel speed $V_F$ is showing a slow tendency to skid. Here it is to be noted that the continuance time $T_1$ is set longer than the aforementioned transition time $T_2$.

Figure 8:
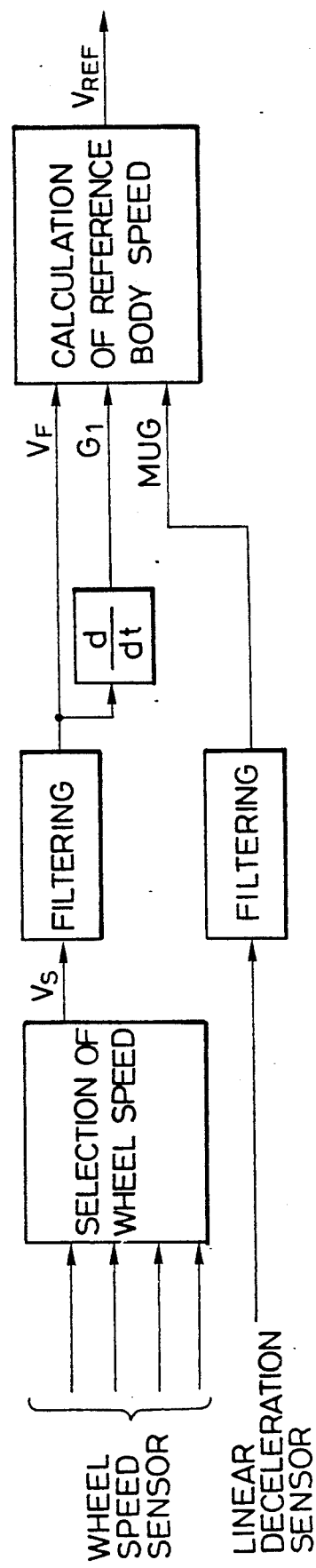
FIG. 8 is a block diagram showing a method for calculating the reference body speed.

Referring now to FIG. 8, there is shown a block diagram used to calculate the reference body speed $V_{REF}$. Since this block diagram should be understood from the above context, its description will be omitted for simplicity. This diagram also indicates that the reference body speed $V_{REF}$ is calculated according to the criterion wheel speed $V_F$ or the detected deceleration MUG in consideration of the calculated deceleration $G_1$.

Figure 9:
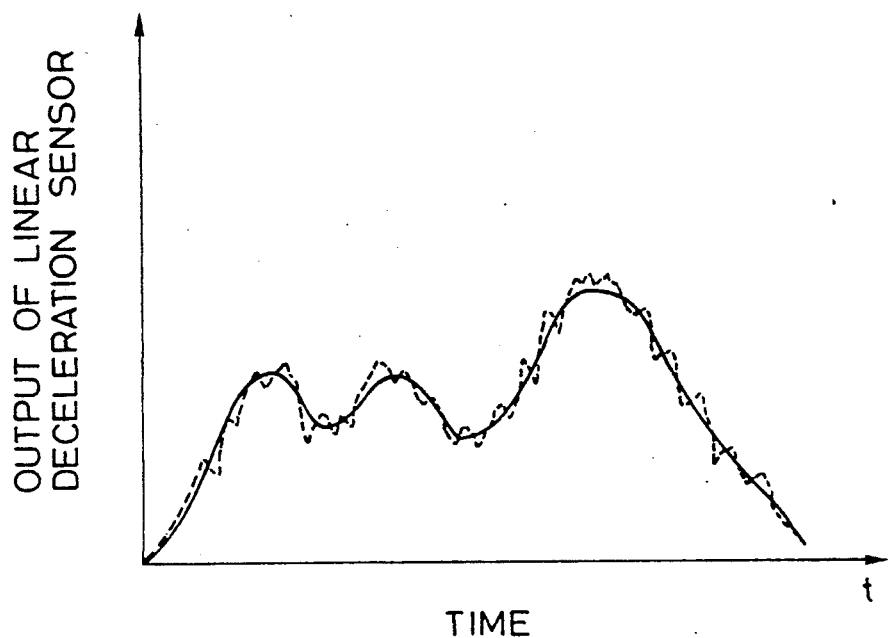
FIG. 9 is a graph showing a output of a linear deceleration sensor after the output passes a filter.

FIG. 9 shows the function of the filter for the linear deceleration sensor 21. This filter eliminates noise component from the output of the linear deceleration sensor 21 and then supplies the filtered output or the detected deceleration MUG to the section for calculating the reference body speed $V_{REF}$. In FIG. 9, the full-line curve indicate the filtered output of the sensor 21 and the broken-line curve indicate the output of the sensor 21 before filtering processing.

Figure 10:
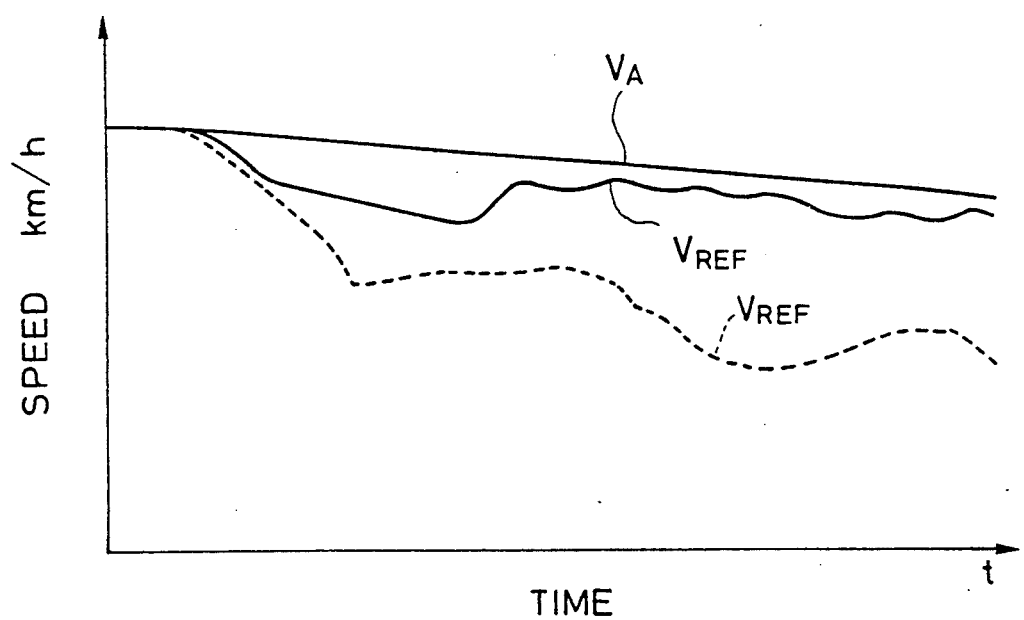
FIG. 10 is a graph showing time-based changes of the reference body speed and an actual body speed calculated according to the present invention.

In FIG. 10, the full-line curves indicate that the reference body speed $V_{REF}$ calculated according to the control method of present invention follows up an actual body speed $V_A$ even though the criterion wheel speed $V_F$ develops a tendency to skid during the ABS control.

The detected deceleration MUG from the linear deceleration sensor 21 cannot take an accurate value immediately after the point of time when the criterion wheel speed $V_F$ develops a tendency to skid for the first time after the start of the ABS control so that the fixed deceleration value $C_G$ is exceeded by the calculated deceleration G1, that is, immediately after the first separating point. In this case, therefore, the reference body speed $V_{REF}$ is calculated on the assumption that the body is decelerated with the first gradient, which depends on the deceleration value $C_G$, for the predetermined transition time $T_2$. Immediately after the start of the ABS control, the reference body speed $V_{REF}$ cannot be calculated to a value much lower than the actual body speed $V_A$.

The value of the detected deceleration value MUG from the linear deceleration sensor 21 is accurate after the passage of the transition time $T_2$. In this case, therefore, the reference body speed $V_{REF}$ is calculated on the assumption that it is lowered with the second gradient which is determined in accordance with the detected deceleration MUG. Thus, the reference body speed $V_{REF}$ takes a value approximate to the actual body speed $V_A$.

The criterion wheel speed $V_F$ is set again as the reference body speed $V_{REF}$ at the point of time when it is restored to the level not lower than the speed $V_{REF}$ while the speed $V_{REF}$ is being calculated separately from the speed $V_F$. In calculating the reference body speed $V_{REF}$, therefore, undesired prolonged use of the detected deceleration MUG can be avoided. If the output from the linear deceleration sensor 21 is used for a long time, it will be subject to accumulated errors, so that the result of calculation of the reference body speed $V_{REF}$ will not be accurate. According to the control method of this embodiment, however, errors can be prevented from being accumulated in the output of the deceleration sensor 21, so that the reference body speed $V_{REF}$ can be calculated with high accuracy.

Thus, according to the present invention, the reference body speed $V_{REF}$ can be properly calculated even if the criterion wheel itself first suffers a slip or skid at the start of the ABS control. Accordingly, the braking pressure control can be also properly effected thereafter, so that each wheel can be most effectively prevented from skidding.

In FIG. 10, the broken-line curve represents a time-based transition of the reference body speed $V_{REF}$ continually adjusted to the criterion wheel speed $V_F$ during ABS control.

It is to be understood that the present invention is not limited to the embodiment described above, and that various changes and modifications may be effected therein by one skilled in the art without departing from the scope or spirit of the invention. For example, the constants for the times and decelerations used in the embodiment are given for purpose of illustration only, and their values may be changed as required.

According to the embodiment described above, moreover, the control method is applied to the antiskid braking system for a four-wheel-drive automobile. The control method of the present invention may, however, be also applied to an antiskid braking system for a two-wheel-drive automobile or one for an automobile which is shiftable between two-wheel drive and four-wheel drive.

What is claimed is:

1. A control method for an antiskid braking system of an automobile, the system comprising wheel speed sensors attached individually to several wheels of the automobile to detect the respective speeds of the wheels, a deceleration sensor attached to a body of the automobile to detect the deceleration of the body, and brake units attached individually to the wheels to control braking forces on the wheels, said control method comprising:

a first step for calcualting a criterion wheel speed, said first step including a first process for selecting one of the wheel speeds, obtained by means of the wheel speed sensors, as a selected wheel speed, and a second process for calculating the criterion wheel speed on the basis of the selected wheel speed;

a second step for obtaining a detected deceleration of the body on the basis of an output from the deceleration sensor, said second step being executed in parallel with said first step;

a third step for differentiating the criterion wheel speed to obtain a calculated deceleration of the body;

a fourth step for calculating a reference body speed in accordance with the value of the calculated deceleration, said fourth step including a third process for adjusting the reference body speed to the criterion wheel speed when the value of the calculated deceleration is not greater than a first predetermined deceleration value, a fourth process for lowering the reference body speed with a fixed first gradient during a predetermined transition time after a point of time when the first predetermined deceleration value is exceeded by the calculated deceleration, and a fifth process for lowering the reference body speed with a second gradient, which is determined in accordance with the detected deceleration of the body, after the passage of the transition time; and a fifth step for controlling the operation of the brake unit of a corresponding one of the wheels when at least one of the wheel speeds develops a tendency to skid so that the wheel speed follows the reference body speed, said steps being executed repeatedly.

2. The control method according to claim 1, wherein said fourth step further includes a sixth process for adjusting the criterion wheel speed to the reference body speed when the criterion wheel speed is restored to the reference body speed after the fourth process is executed.

3. The control method according to claim 2, wherein said fourth step further includes a seventh process executed when said calculated deceleration is greater than a second deceleration value, which is set corresponding to the detected deceleration and is smaller than the first deceleration value after the sixth process, said reference body speed being lowered with said second gradient.

4. The control method according to claim 3, wherein said second gradient is set at a value obtained by adding a first fixed positive value to the detected deceleration, and said second deceleration value is set at a value obtained by adding a second fixed positive value greater than the first fixed value to the detected deceleration.

5. The control method according to claim 1, wherein said fourth step further includes a sixth process executed when a state occurs in which said calculated deceleration is greater than a second deceleration value, which is set corresponding to the detected deceleration and is smaller than the first deceleration value, and said state is maintained for a predetermined continuance time, said reference body speed being lowered with said second gradient in said sixth process.

6. The control method according to claim 5, wherein said continuance time is longer than the transition time.

7. The control method according to claim 5, wherein said second gradient is set at a value obtained by adding a first fixed positive value to the detected deceleration, and said second deceleration value is set at a value obtained by adding a second fixed positive value greater than the first fixed value to the detected deceleration.

8. The control method according to claim 1, wherein said deceleration sensor is a linear deceleration sensor and said second step includes continuously detecting a detection signal indicative of the deceleration of the body from the linear deceleration sensor.

9. The control method according to claim 8, wherein said second step includes a process for filtering an output from the deceleration sensor before calculating the detected deceleration from the deceleration sensor output.

10. The control method according to claim 1, wherein said first gradient is adjusted to the first predetermined deceleration value.

11. The control method according to claim 1, wherein said second gradient is set at a value obtained by adding a fixed positive value to the detected deceleration.

12. The control method according to claim 1, wherein the second highest wheel speed, among other wheel speeds obtained by means of the wheel speed sensors, is selected as the selected wheel speed in said first process of said first step.

* * * * *